US008118433B2

(12) United States Patent  
Ishii

(10) Patent No.: US 8,118,433 B2  
(45) Date of Patent: Feb. 21, 2012

(54) IMAGE PROJECTION APPARATUS AND CONTROL METHOD FOR SAME

(75) Inventor: Yoshiki Ishii, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 34 days.

(21) Appl. No.: 12/447,920

(22) PCT Filed: Aug. 22, 2008

(86) PCT No.: PCT/JP2008/065469  
§ 371 (c)(1),  
(2), (4) Date: Apr. 30, 2009

(87) PCT Pub. No.: WO2009/031457  
PCT Pub. Date: Mar. 12, 2009

(65) Prior Publication Data  
US 2010/0157254 A1 Jun. 24, 2010

(30) Foreign Application Priority Data  
Sep. 4, 2007 (JP) ................. 2007-229456

(51) Int. Cl.  
*G09G 5/00* (2006.01)  
*G03B 21/14* (2006.01)
(52) U.S. Cl. ........... 353/42; 345/156; 353/121; 353/122
(58) Field of Classification Search ................ 353/42, 353/121, 122; 345/145, 146, 156, 157, 173, 345/175, 179; 348/14, 18, 61, 552  
See application file for complete search history.

(56) References Cited

U.S. PATENT DOCUMENTS

| 5,528,263 | A | * | 6/1996 | Platzker et al. | 345/156 |
| 6,323,839 | B1 | * | 11/2001 | Fukuda et al. | 345/157 |
| 6,346,933 | B1 | * | 2/2002 | Lin | 345/157 |
| 6,788,289 | B2 | | 9/2004 | Kitazawa | |
| 6,802,611 | B2 | * | 10/2004 | Chu et al. | 353/28 |
| 6,840,627 | B2 | * | 1/2005 | Olbrich | 353/42 |
| 6,979,087 | B2 | * | 12/2005 | Honig et al. | 353/121 |
| 7,862,179 | B2 | * | 1/2011 | Shan et al. | 353/42 |
| 2001/0028341 | A1 | * | 10/2001 | Kitazawa | 345/156 |
| 2003/0030622 | A1 | * | 2/2003 | Vaarala | 345/158 |
| 2007/0192691 | A1 | | 8/2007 | Inazumi | |
| 2008/0143975 | A1 | * | 6/2008 | Dennard et al. | 353/42 |

FOREIGN PATENT DOCUMENTS

GB 2374663 A 10/2002

(Continued)

OTHER PUBLICATIONS

European Search Report issued on Nov. 5, 2010.  
May 30, 2011 Japanese Office Action.

*Primary Examiner* — William C Dowling  
(74) *Attorney, Agent, or Firm* — Cowan, Liebowitz & Latman, P.C.

(57) ABSTRACT

In an image projection apparatus, a sensed image obtained by sensing a projection surface, which contains a projected image, is obtained. Then, a difference image obtained by removing the projected image from the sensed image is used to detect a region corresponding to a predetermined object such as a user's hand or a pointer. Then, a user operation is determined based on the position and temporal variations of a particular portion of the region corresponding to the predetermined object.

9 Claims, 12 Drawing Sheets

FOREIGN PATENT DOCUMENTS

| | | |
|---|---|---|
| JP | 07-093089 A | 4/1995 |
| JP | 2005-141151 A | 6/2005 |
| JP | 2005-236746 A | 9/2005 |
| JP | 2005-267034 A | 9/2005 |
| JP | 2007-219814 A | 8/2007 |
| WO | 95/34881 A1 | 12/1995 |
| WO | 2006-104132 A | 10/2006 |

\* cited by examiner

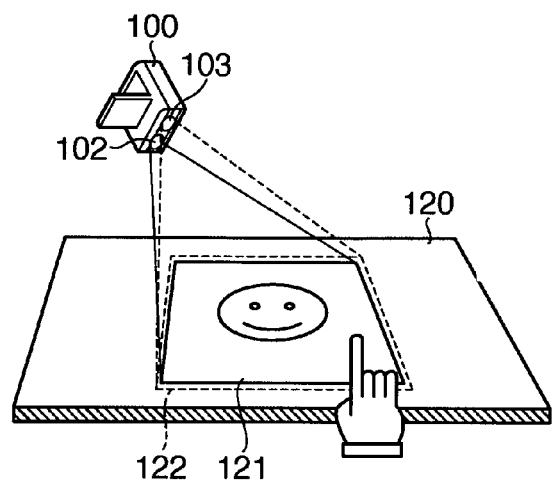
FIG. 5A
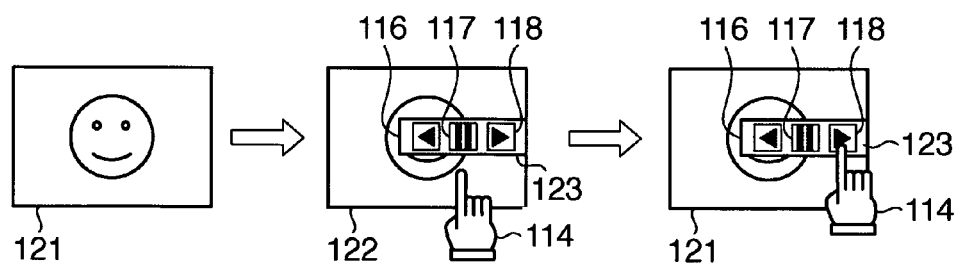
FIG. 5B   FIG. 5C   FIG. 5D

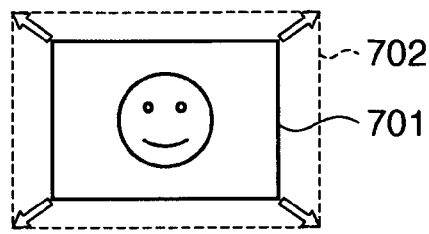
FIG. 7
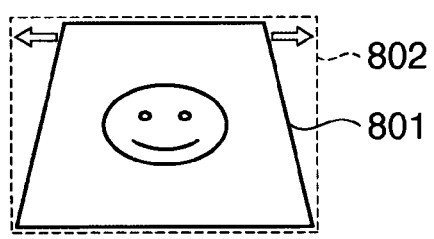 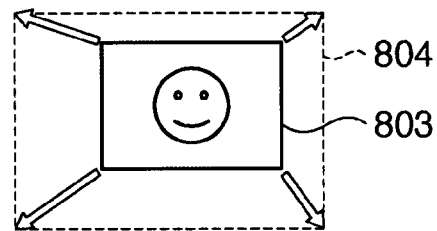
FIG. 8A    FIG. 8B

IMAGE PROJECTION APPARATUS AND CONTROL METHOD FOR SAME

CROSS-REFERENCE TO RELATED APPLICATIONS

This application is a national stage application of International Application No. PCT/JP2008/065469, filed Aug. 22, 2008, whose benefit is claimed and which claims the benefit of Japanese Patent Application No. 2007-229456, filed Sep. 4, 2007, whose benefit is also claimed.

TECHNICAL FIELD

The present invention relates to an image projection apparatus that projects an image and a control method for the same, and more particularly, to an image projection apparatus capable of utilizing a projected image as a user interface for operating the image projection apparatus, and a control method for the same

BACKGROUND ART

Conventionally, an image projection apparatus as typified by a projector is designed to project video images output by a computer, media player, or the like for viewing purposes, and is used not only in conference rooms and stores, of course, but also in homes.

The conventional projector, because it is designed to project onto a large-screen, is relatively large itself, and is usually affixed to the ceiling or placed on a desk or the floor when in use.

Operation of this type of projector is typically carried out using a variety of buttons provided on the body of the projector or with a remote-control device provided as an accessory to the projector.

By contrast, in order to view images in small groups of four or five people, equipping a mobile phone with a built-in, small-scale image projection apparatus has been proposed (see Japanese Patent Application Publication No. 2005-236746).

When projecting video images using an image projection apparatus built into a mobile phone, it is contemplated that the mobile phone is taken and held in the hand. Then, it is assumed that a need arises to operate the image projection apparatus during projection, for example, to switch images, or to change the settings of the image projection apparatus.

In this case, it is likely that operation is carried out using the phone buttons and keys with which mobile phones are ordinarily provided. However, operating buttons and keys while holding the mobile phone and projecting images causes the projection place to fluctuate and the size of the projected images to fluctuate, and is not easy to use.

Moreover, providing the mobile phone with a separate remote-control device for operating the image projection apparatus is not practical.

Thus, conventionally, there has been no proposal to facilitate user operations taking into account a case in which the image projection apparatus has been made so compact that it is held in the hand when used.

DISCLOSURE OF INVENTION

The present invention is conceived in light of the problem described above, and provides an image projection apparatus that can be easily operated by a user, and a control method for the same.

According to an aspect of the present invention, there is provided an image projection apparatus comprising: a projection unit adapted to project an input image onto a projection surface; an obtaining unit adapted to obtain a sensed image of a range containing an image projected onto the projection surface; a generating unit adapted to generate a difference image between the sensed image and the input image; a region detection unit adapted to detect a region corresponding to an operation object for operating the image projection apparatus, based on the difference image; a position detection unit adapted to detect information relating to a position of a particular portion of the region corresponding to the operation object detected by the region detection unit; a determination unit adapted to determine an operation carried out by the operation object, based on the information relating to the position of the particular portion detected by the position detection unit; and a control unit adapted to execute an action corresponding to the operation determined by the determination unit.

According to another aspect of the present invention, there is provided a control method for an image projection apparatus, comprising: a projection step for projecting an input image onto a projection surface by a projection unit; an obtaining step for obtaining a sensed image of a range containing an image projected onto the projection surface; a generating step for generating a difference image between the sensed image and the input image; a region detection step for detecting a region corresponding to an operation object for operating the image projection apparatus based on the difference image; a position detection step for detecting information relating to the position of a particular portion of the region corresponding to the operation object detected in the region detection step; a determination step for determining an operation carried out by the operation object, based on the information relating to the position of the particular portion detected in the position detection step; and a control step for controlling an action corresponding to the operation determined in the determination step.

Further features of the present invention will become apparent from the following description of exemplary embodiments with reference to the attached drawings.

BRIEF DESCRIPTION OF DRAWINGS

FIGS. 5A to 5D are diagrams schematically illustrating in-use states of the image projection apparatus according to the first embodiment of the present invention;

FIG. 7 is a diagram illustrating an example of correction information output by a camera feedback unit 212 in the image projection apparatus 100 according to the first embodiment of the present invention;

FIGS. 8A and 8B are diagrams illustrating examples of correction processing carried out by a sensed image correction unit 206 in the image projection apparatus 100 according to the first embodiment of the present invention;

BEST MODE FOR CARRYING OUT THE INVENTION

Preferred embodiments of the present invention will now be described in detail in accordance with the accompanying drawings.

First Embodiment

Figure 1:
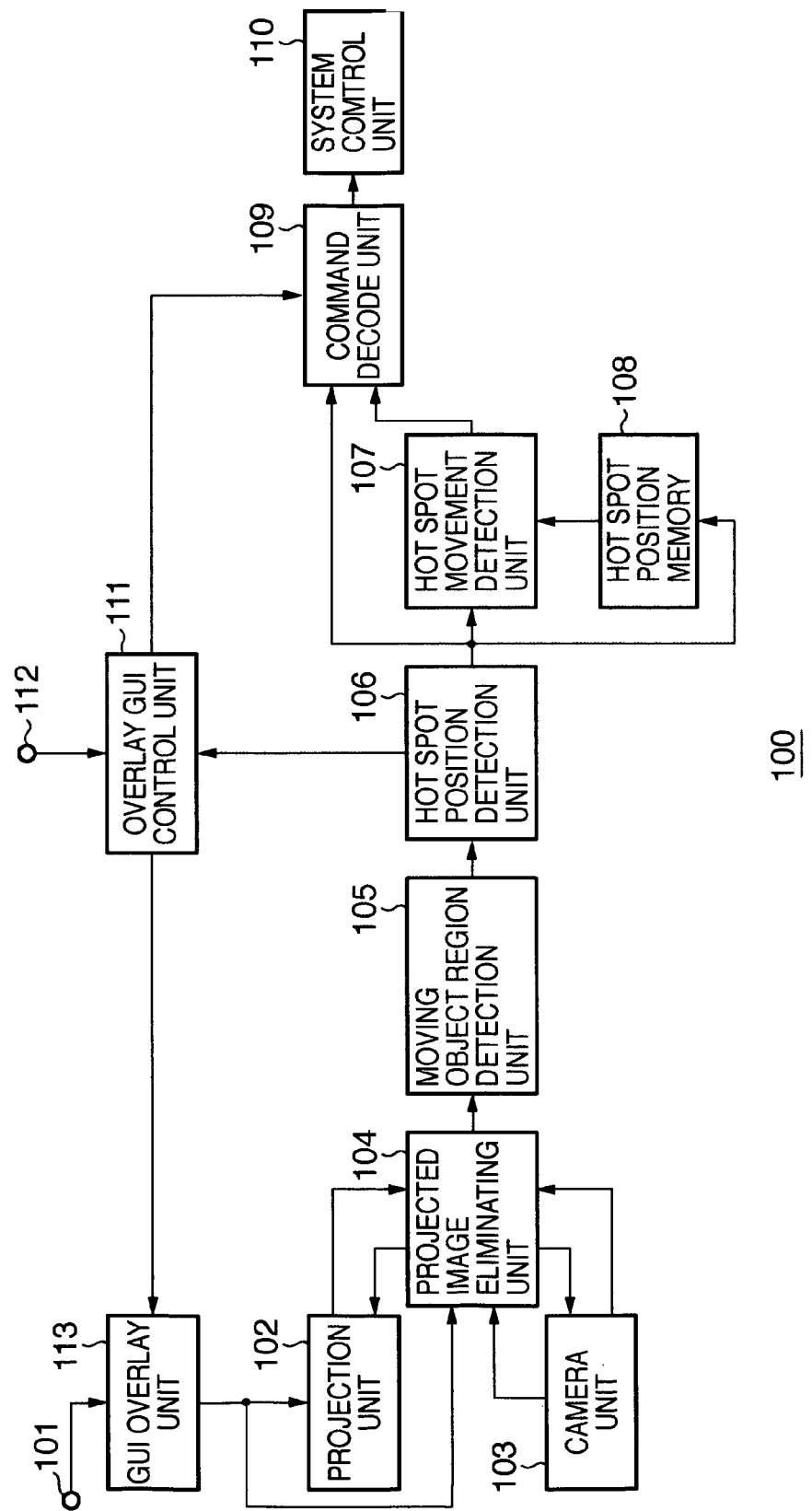
FIG. 1 is a block diagram illustrating a schematic configuration example of an image projection apparatus 100 according to a first embodiment of the present invention.

FIG. 1 is a block diagram illustrating a schematic configuration example of an image projection apparatus 100 according to a first embodiment of the present invention.

In the image projection apparatus 100, image signals input from a terminal 101 are input via a GUI overlay unit 113 to a projection unit 102, and projected onto a projection surface (a screen, a desk, etc.) which is not shown. A camera unit 103 is used to shoot, as moving images, images on the projection surface, which contain images being projected (projected images) from the projection unit 102.

FIG. 5A shows projecting and shooting with the use of the image projection apparatus 100 in the present embodiment. A projected image 121 projected from an optical system of the projection unit 102 is projected onto a projection surface 120 such as a top panel of a desk, while at the same time an area 122 of the projection surface 120 containing the projected image 121 is sensed by the camera unit 103.

FIGS. 5B to 5D are diagrams schematically illustrating a method for a user to operate the image projection apparatus 100 in the present embodiment. The image projection apparatus 100 in the present embodiment detects user instructions on the projected image, and operates based on the detected user instructions.

FIG. 5B shows the projected image 121 viewed from directly above. Then, the image projection apparatus 100 in the present embodiment superimposes a GUI 123 for operating the image projection apparatus 100 on the projected image 121, as shown in FIG. 5C. The GUI 123 includes buttons 116 to 118, and a user can press any of the buttons 116 to 118 by hand to instruct operations corresponding to the buttons 116 to 118. Display of the GUI 123 may be triggered by a detection of a user's hand on the projected image.

As shown in FIG. 5D, when it is detected that a particular portion (for example, a fingertip) of the hand operating the GUI is placed on the button 118, the image projection apparatus 100 operates with the assumption that the operation corresponding to the button 118 is instructed.

Specific actions for achieving such operations will be described below.

Image signals input from the terminal 101 are projected from the projection unit 102, as well as supplied to a projected image eliminating unit 104.

In the projected image eliminating unit 104, an image sensed by the camera unit 103 is compared with a projected image from the projection unit 102, that is, the input image from the terminal 101, to eliminate, from the sensed image, image components being projected. The projected image eliminating unit 104 receives camera characteristic information from the camera unit 103 as well as controls the camera unit 103 depending on the result of the comparison between the projected image and the sensed image, in order to improve accuracy in the elimination of the projected image. Further, the projected image eliminating unit 104 receives projector characteristic information from the projection unit 102 as well as controls the projection unit 102 and the camera unit 103 depending on the result of the comparison between the projected image and the sensed image, again in order to improve the accuracy of elimination of the projected image. Specifically, for example, color temperature information or the like as an example of the projector characteristic information can be used to exercise white balance control over the camera. These types of control will be described.

Figure 2:
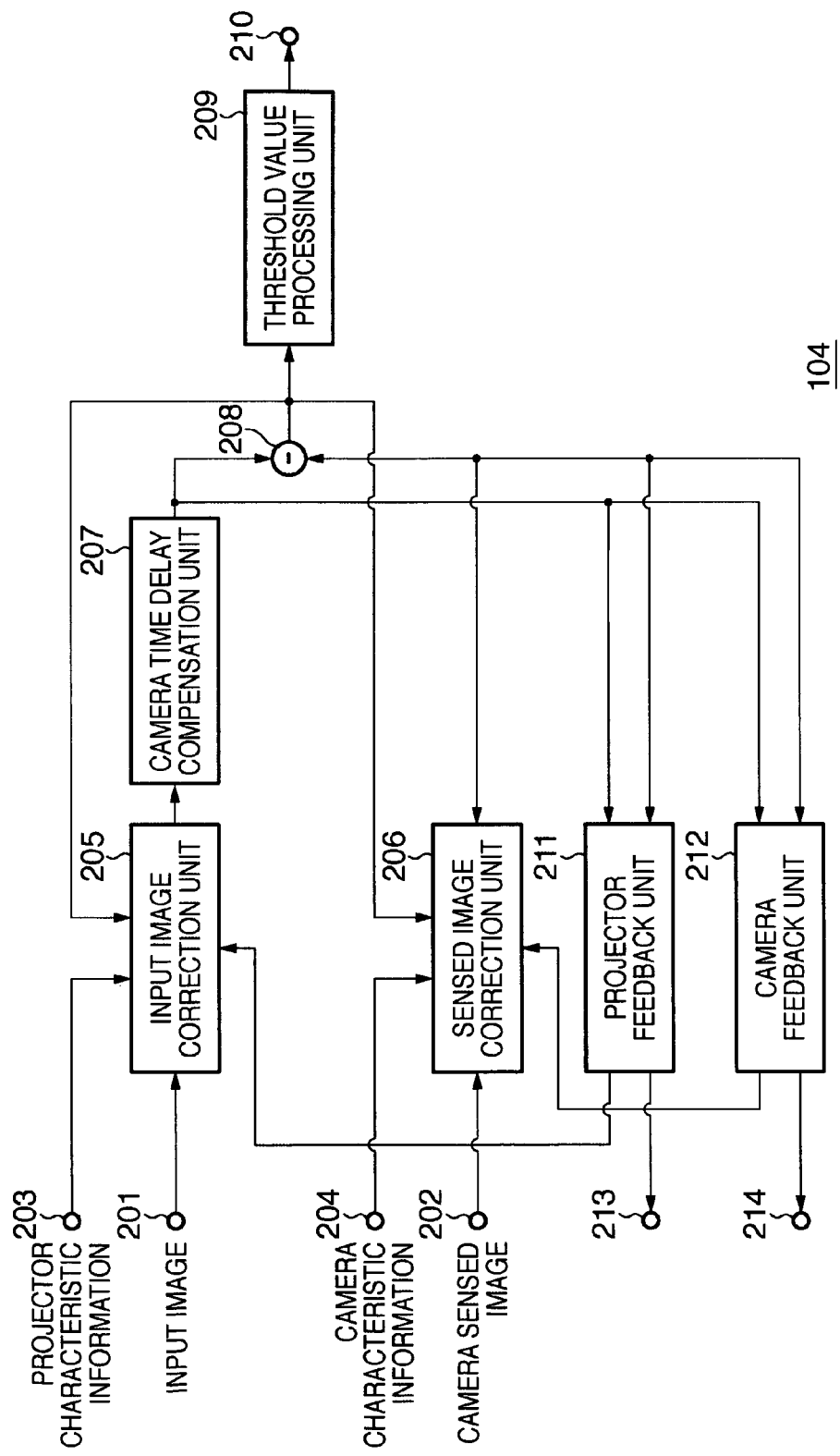
FIG. 2 is a block diagram illustrating a configuration example of a projected image eliminating unit 104 in the image projection apparatus 100 according to the first embodiment of the present invention.

FIG. 2 is a block diagram illustrating a configuration example of the projected image eliminating unit 104 in the image projection apparatus 100 in the present embodiment. An input image being projected by the projection unit 102 (an output from the GUI overlay unit 113) is input from a terminal 201, whereas an image being sensed by the camera unit 103 (a camera sensed image) is input from a terminal 202.

An input image correction unit 205 corrects input image signals, based on:
  projector characteristic information (for example, color temperature information) supplied via a terminal 203 from the projection unit 102;
  a difference image between the corrected input image and the corrected camera sensed image obtained from a comparison circuit 208; and
  correction information supplied from a projector feedback unit 211,
  such that the residual of the corrected input image components in the difference image is minimized. This type of correction includes, for example, correction performed by canceling projector-specific and currently set color characteristics.

On the other hand, a sensed image correction unit 206 corrects sensed image signals, based on:
  camera characteristic information supplied from a terminal 204;
  a difference image between the corrected input image and the corrected camera sensed image obtained from the comparison circuit 208; and
  correction information supplied from a camera feedback unit 212,
  such that the residual of the input image components in the difference image is minimized.

This type of correction includes, for example:
- camera-specific color characteristics and currently set color characteristics;
- correction of luminance;
- correction of geometric distortion due to projection (correction from a trapezoidal region 801 indicated by a solid line to a rectangular region 802 indicated by a dotted line), as shown in FIG. 8A; and
- clipping and enlargement of a region of a projection angle of view for eliminating discrepancy in shooting angle of view (enlargement from an image of a sensed range 803 indicated by a solid line to an image of a range 804 indicated by a dotted line), as shown in FIG. 8B.

In the present embodiment, the input image correction unit 205 and the sensed image correction unit 206 are shown separately for purposes of illustration. However, it is also possible to reduce the circuit scale by causing the sensed image correction unit 206 to carry out the processing performed by the input image correction unit 205.

A camera time delay compensation unit 207 compensates for a time delay caused in the route in which the input image is projected by the projection unit 102 and sensed by the camera unit 103.

The comparison circuit 208 compares the corrected input image with the corrected camera sensed image to obtain a difference, and a threshold value processing unit 209 extracts signals at a predetermined threshold value or more in order to inhibit effects of residual components and noise components. This allows elimination of a projected image to be achieved, in which false detection due to movements or shapes in the projected images is inhibited. The output from the threshold value processing unit 209 is supplied to a moving object region detection unit 105 as a result of eliminating the input image, that is, the projected image, from the sensed image.

The projector feedback unit 211 outputs, based on the corrected input information and the corrected camera sensed image, correction information for optimizing the operation of the projection unit 102, from a terminal 213 to the projection unit 102. As this correction information, information for correcting, for example, projection distortion shown in FIG. 8A on the projector side is conceivable.

The camera feedback unit 212 outputs, based on the corrected input information and the corrected camera sensed image, correction information for optimizing the operation of the camera unit 103, from a terminal 214 to the camera unit 103. As this correction information, information for correcting, for example, the relationship between a projection angle of view 702 and a shooting angle of view 701 shown in FIG. 7 by varying the zoom magnification of the camera is conceivable, that is, information for correcting so that the shooting angle of view 701 the projection angle of view 702.

It is to be noted that the described processing for correction of the input image and the sensed image may be controlled to be executed as part of a calibration process during start-up of the image projection apparatus, but not to be executed any more thereafter. Alternatively, the processing may be executed on a regular basis, or executed based on a user's instruction. For a period during which no correction processing is carried out, the input image correction unit 205 and the sensed image correction unit 206 respectively supply input images and sensed images to the comparison circuit 208 without correcting the input images and the sensed images. In addition, for the period, the projector feedback unit 211 and the camera feedback unit 212 output no correction information.

Returning to FIG. 1, the moving object region detection unit 105 detects a region regarded as a moving object, from the sensed image with the projected image eliminated. In the present embodiment, a region of a finger is detected as shown in FIGS. 5B to 5D.

Figure 3:
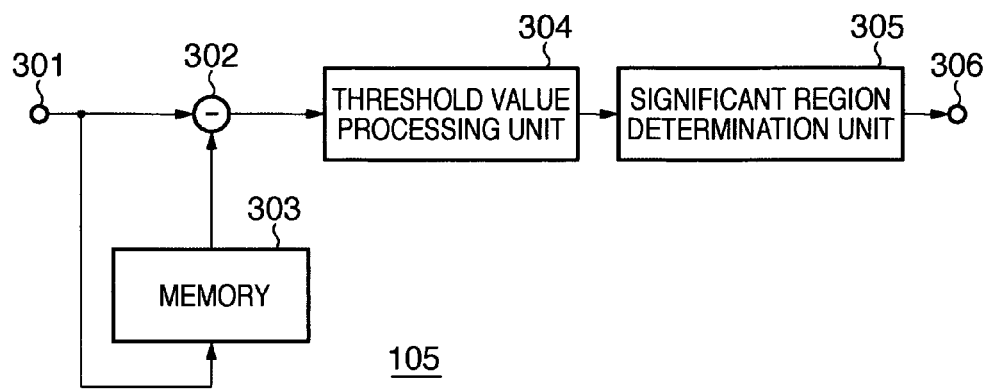
FIG. 3 is a block diagram illustrating a configuration example of a moving object region detection unit 105 in the image projection apparatus 100 according to the first embodiment of the present invention.

FIG. 3 is a block diagram illustrating a configuration example of the moving object region detection unit 105 in the image projection apparatus 100 in the present embodiment.

The sensed image with the projected image eliminated is input from the projected image eliminating unit 104 to a terminal 301. The sensed image with the projected image eliminated is written in a memory 303. The memory 303 is configured to be able to store at least two frames (screens) of sensed images.

In a difference circuit 302, a difference image is generated between the input sensed image with the projected image eliminated and a previous sensed image with a projected image eliminated, which is delayed by a predetermined period of time by the memory 303. Then, the difference image is supplied to a threshold value processing unit 304. In other words, the difference circuit 302 generates a difference image between multiple difference images generated by the projected image eliminating unit 104 at different moments of time.

The threshold value processing unit 304, in order to eliminate noise components, extracts only signals at a predetermined threshold value or more as temporally varying components, and supplies the signals to a significant region determination unit 305.

The significant region determination unit 305 determines, as a significant region, a closed region excluding isolated points (isolated pixels) and the like in the temporally varying components, and outputs information relating to the significant region (information for specifying the region) from a terminal 306. The probability of falsely detecting a pattern in the background and the like as moving objects can be limited by determining, as a significant region, the closed region excluding isolated points.

Figure 4:
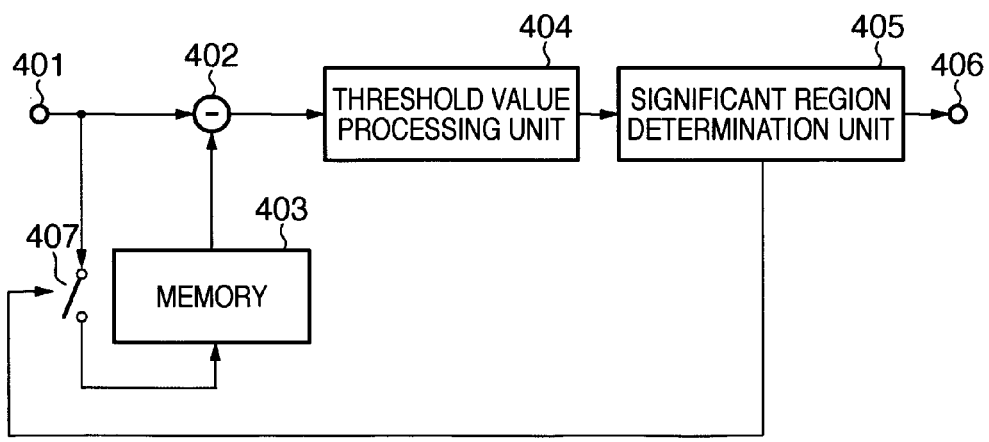
FIG. 4 is a block diagram illustrating another configuration example of the moving object region detection unit 105 in the image projection apparatus 100 according to the first embodiment of the present invention.

FIG. 4 is a block diagram illustrating another configuration example of the moving object region detection unit 105 in the image projection apparatus 100 in the present embodiment.

The configuration example of FIG. 3 may produce a period for which moving object region detection is not able to detect a desired moving object (here, a finger), depending on the relationship between a detection interval T for a moving object and the movement of the moving object. Therefore, in the configuration example of FIG. 4, an image immediately before detection of a moving object is held as a background image (an image without moving objects). This allows determination of a significant region even in a case in which a detected moving object stands still along the way. This configuration is effective particularly in a case in which input images, that is, projected images are static, for example, as in the case of playing back still images.

The sensed image with the projected image eliminated is input from the projected image eliminating unit 104 to a terminal 401. The sensed image with the projected image eliminated is written in a memory 403 via a switch 407 in a closed state. The memory 403 is configured to be able to store sensed images, and configured to hold previous sensed images supplied to the difference circuit 402 until a significant region determination unit 405 completes determination.

In a difference circuit 402, a difference image is obtained between the input sensed image with the projected image eliminated and a previous sensed image with a projected image eliminated that is delayed by a predetermined period of time by the memory 403. Then, the difference is supplied to a threshold value processing unit 404.

The threshold value processing unit 404, in order to eliminate noise components, extracts only signals at a predetermined threshold value or more as temporally varying components, and supplies the signals to the significant region determination unit 405.

The significant region determination unit 405 determines a significant region in the same way as the significant region determination unit 305, and outputs information relating to the significant region (information for specifying the closed region) from a terminal 406. Further, the significant region determination unit 405 exercises control to open the switch 407 in a case in which there is the closed region detected as the significant region. This prevents new sensed images from being written in the memory 403 such that the image containing no moving objects, used for detection of the significant region, is held in the memory 403 as a background image.

It is to be noted that it is also possible to prevent unnecessary movements at the edges of the image frame due to camera shake from being falsely detected, by limiting the effective region of the moving object region detection unit 105.

Figure 9:
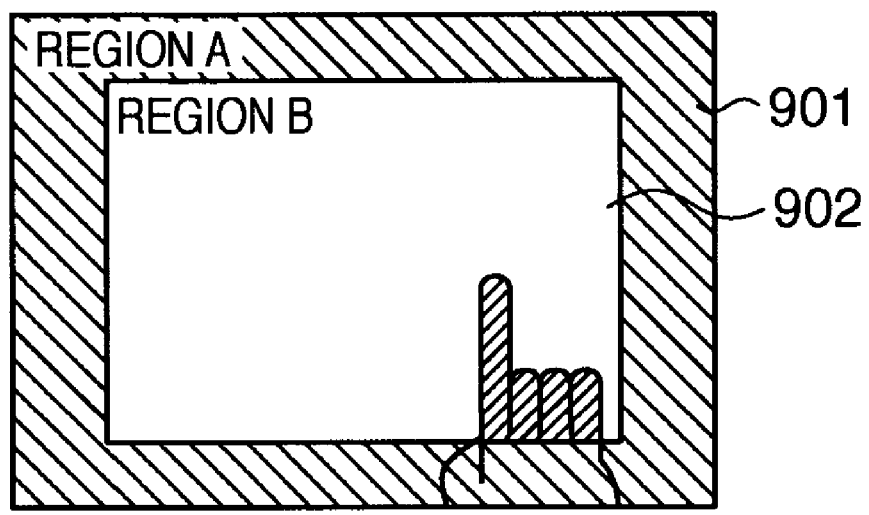
FIG. 9 is a diagram illustrating an example of setting the effective region of the moving object region detection unit 105 in the image projection apparatus 100 according to the first embodiment of the present invention.

FIG. 9 shows an example of the effective region of the moving object region detection unit 105.

A region A 901 is a region adjacent to a periphery of the image, and is considered as a region that is likely to be contained in a sensed region due to camera shake to cause false detection of moving objects particularly in a case in which the image projection apparatus 100 is held by hand. Therefore, for the region A 901, the threshold value for determining a closed region as a significant region can be made higher than the threshold value applied to a region B 902 other than the peripheral portion of the image. Alternatively, with the region A 901 excluded from detection of the closed region, the closed region may be detected from only the region B 902.

Thus, as described above, false detection of significant regions caused by camera shake can be inhibited by setting such an effective region.

Returning to FIG. 1, a hot spot position detection unit 106 detects the position of a particular portion (referred to as a hot spot) for determining operation of a GUI, from the significant region detected by the moving object region detection unit 105. In the present embodiment, a portion determined as the tip of the finger is detected from the significant region, and the position of the portion (hot spot position) is detected. For a specific approach for carrying out this detection, known techniques are available as fingertip detection approaches according to region tip detection or circular region detection, and detailed descriptions thereof will be thus omitted here. The hot spot position detected by the hot spot position detection unit 106 is supplied to a hot spot movement detection unit 107, a hot spot position memory 108, and a command decode unit 109.

An overlay GUI control unit 111 decides the display position of a GUI (an operation GUI) for operating the image projection apparatus 100, based on device operation mode information supplied from a terminal 112 and the detection result from the hot spot position detection unit 106. The device operation mode information refers to, for example, operational states such as PLAY and STOP provided from a system controller (or a mode controller) of the device. Based on the device operation mode information, a GUI in the shape according to the operational state can be displayed. The overlay GUI control unit 111 decides a GUI image to be overlay displayed and the display position thereof from the relative positions of the GUI according to the device operation mode information and the hot spot, and outputs the GUI image and the display position to the GUI overlay unit 113. The overlay GUI control unit 111 decides, for example, a position which is easy to operate with respect to the detected hot spot position, as the display position. Specifically, for example, a neighborhood position without being hidden behind a hand immediately after being displayed or protruding from the screen can be determined as the display position.

Further, the GUI overlay unit 113 superimposes an operation GUI image prepared in advance onto an image projected from the projection unit 102, depending on the display position and GUI image from the overlay GUI control unit 111, and supplies to the projection unit 102 the operation GUI image superimposed onto the image projected from the projection unit 102. This results in the operation GUI image overlay being displayed (superimposed) on the projected image.

For example, as shown in FIG. 5C, the operation GUI can be displayed when a region of a user's hand is detected by the moving object region detection unit 105 as a significant region and the position of a fingertip is detected by the hot spot position detection unit 106 as a hot spot position.

The hot spot movement detection unit 107 compares the hot spot position detected by the hot spot position detection unit 106 with previous position history stored in the hot spot position memory 108 to detect movements of the hot spot. The hot spot movement detection unit 107 outputs information relating to the detected movements of the hot spot (for example, information indicating types of movements (such as circular motion and linear motion)) to the command decode unit 109.

The command decode unit 109 determines the operation carried out on the operation GUI by the user, from:
the hot spot position detected in the hot spot position detection unit 106;
the information relating to movements of the hot spot, which is supplied from the hot spot movement detection unit 107; and
the GUI display position information supplied from the overlay GUI control unit 111,
generates a corresponding device control command, and outputs the device control command to a system control unit 110.

The system control unit 110 controls components which are not shown in the figure, and carries out processing in accordance with the device control command. For example, if the device control command is a command for switching the projected image, image data to be displayed next is read from a storage device that is not shown in the figure and supplied via the terminal 101 to the overlay unit 113.

As examples of the operation determined by the command decode unit 109, the following is conceivable.

For example, in FIG. 5D, in a case in which information on a hot spot movement corresponding to a particular gesture is detected, for example, in a circular motion of the hot spot position on a particular area on the operation GUI, it is determined that the operation assigned to that particular area is instructed.

In a case in which the moving object region detection unit 105 takes the configuration of FIG. 4, as in the function of playing back still images, it is possible to detect the hot spot position even with the object in a static state. Therefore, in a case in which the hot spot stands still on the particular area for a predetermined period of time, it is also possible to determine that the operation assigned to that particular area is instructed.

In each case, the command decode unit 109 generates a device control command in accordance with the determined operation, and outputs the device control command to the system control unit 110.

Figure 6:
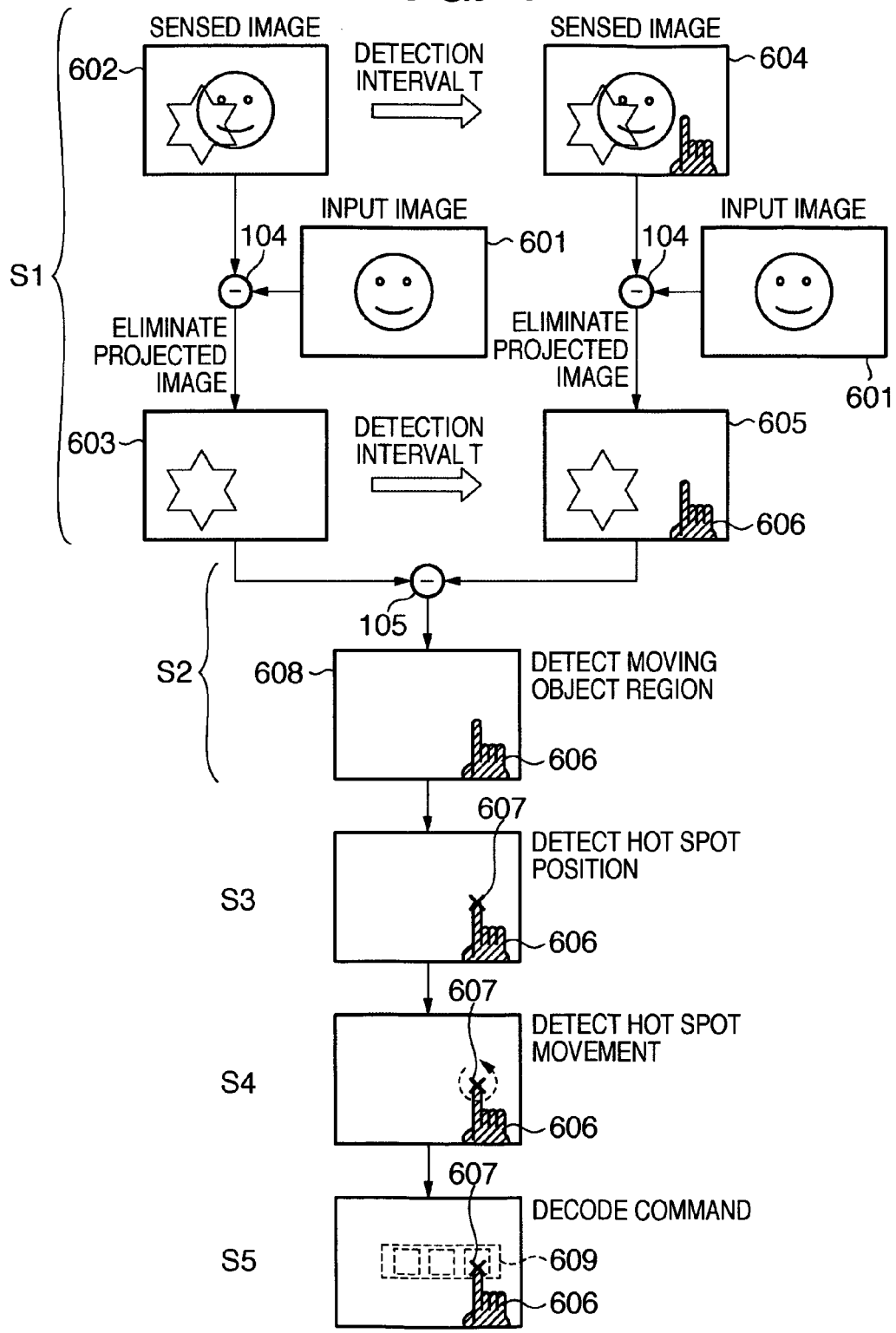
FIG. 6 is a diagram schematically illustrating detection of user operation in the image projection apparatus 100 according to the first embodiment of the present invention.

FIG. 6 is a diagram schematically illustrating detection of user operation in the image projection apparatus 100 in the present embodiment.

In the example of FIG. 6, an input image 601, that is, a projected image is a face mark, and there is a star pattern on a projection surface to serve as a background. Therefore, the face mark and the star pattern are both contained in a sensed image 602. A detection interval T corresponds to an interval of detection processing, which is decided by an interval of writing in the memory 303 of FIG. 3. In the example of FIG. 6, it is assumed that a hand as an object for operating an operation GUI comes into the sensed range of the camera unit 103 after a lapse of the detection interval T.

It is to be noted that, although not shown in FIG. 6, in a case in which the operation GUI is superimposed, the operation GUI image is contained in the input image 601.

In S1 of FIG. 6, the input image 601 (that is, the projected image) is eliminated from the sensed image 602 in the projected image eliminating unit 104. A difference image 603 obtained by this processing contains only the star background pattern, regardless of whether or not the operation GUI image is contained in the input image 601. Further, the image after the detection interval T is also processed in the same way. In other words, the input image 601 is removed from the sensed image 604. An image 605 thus obtained contains a user's hand 606 which has come into the sensed region and the star pattern, regardless of whether or not the operation GUI image is contained in the input image 601.

In S2, the moving object region detection unit 105 compares the two difference images 603 and 605 with the projected images eliminated, which are temporally separated by the detection interval T, and detects a moving object region. This processing eliminates the projected image and the background pattern without variation with time, thereby obtaining an image 608 containing only the hand 606. Thus, the region of the hand 606 is determined as a significant region, that is, a moving object region.

In S3, the hot spot position detection unit 106 detects, from the region determined as a moving object region in S2, the position of a particular portion (here, a fingertip) to be used for detecting operations on the operation GUI, as a hot spot position 607.

In S4, the hot spot movement detection unit 107 detects movements of the hot spot from temporal variations of the hot spot position 607 detected in S3.

In S5, the command decode unit 109 specifies, in a case in which the operation GUI 609 is displayed, the display position of an operation GUI 609 and an operation instructed by the user from the movement of the hot spot detected in S4 and the position of the hot spot, and outputs a corresponding device operation command.

As described above, according to the present embodiment, a GUI image superimposed on a projected image can be used to carry out operations on the image projection apparatus, without the use of keys or button of the image projection apparatus itself. Therefore, even in a case in which projection is carried out with the image projection apparatus held by a hand, the image projection apparatus can be operated while inhibiting the possibilities of projected images being blurred or distorted. Thus, the present embodiment can be particularly preferably applied to small devices such as cellular phones. Further, since an object for operating the GUI image, for example a hand, is detected based on the difference between sensed images, the processing is easy, and it is unnecessary to use a special image sensing apparatus such as an infrared camera. In particular, current cellular phones already have built-in cameras, and the existing cameras can be diverted without newly adding cameras.

Furthermore, holding, as a background image, a sensed image from which an object (operation object) for operating the GUI image is not detected allows detection of the operation object to be more secure.

Second Embodiment

Figure 10:
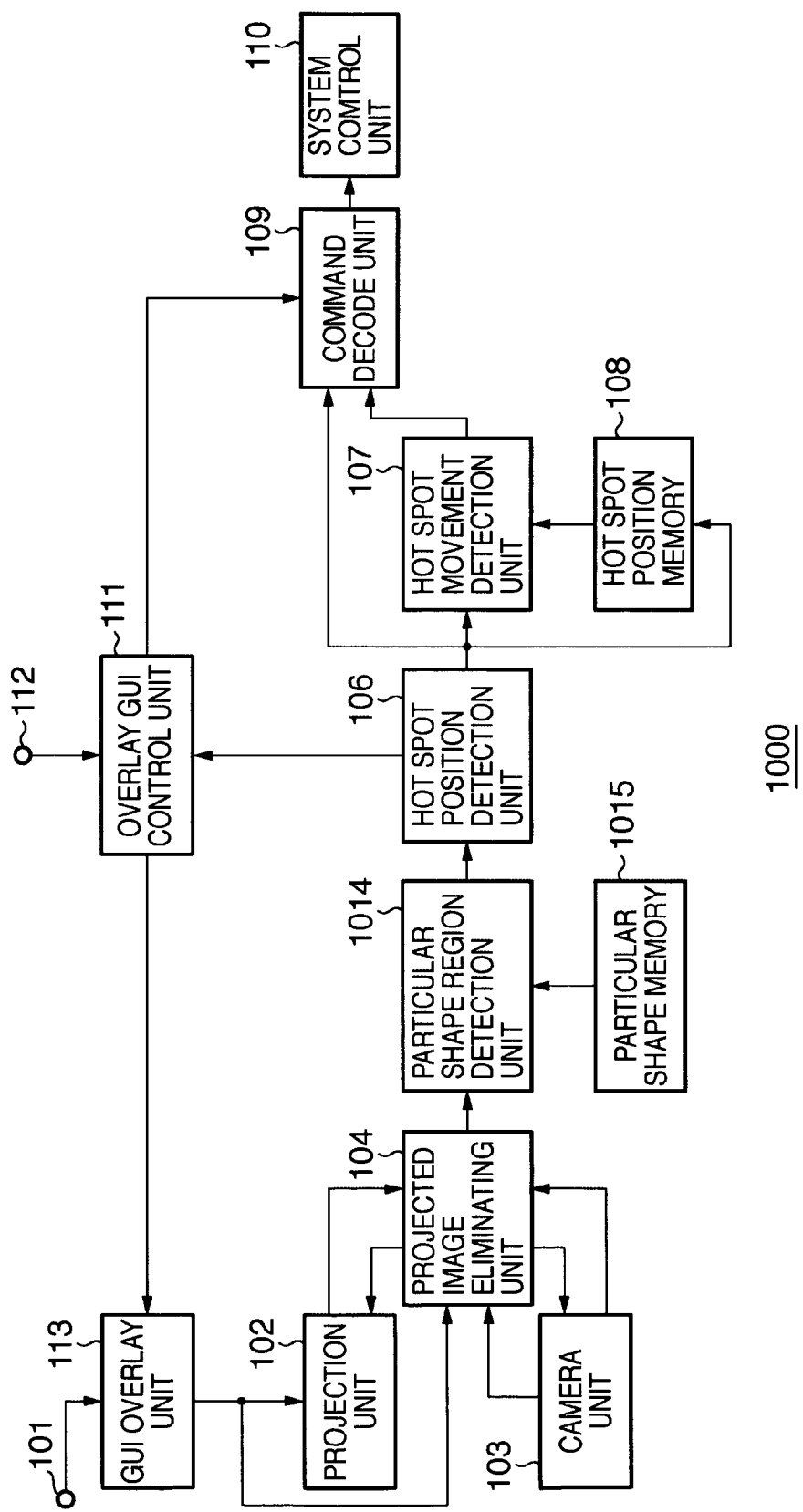
FIG. 10 is a block diagram illustrating a schematic configuration example of an image projection apparatus 1000 according to a second embodiment of the present invention.

FIG. 10 is a block diagram illustrating a schematic configuration example of an image projection apparatus according to a second embodiment of the present invention. In FIG. 10, the same components as those of FIG. 1 are denoted by the same reference numerals, and overlapping descriptions thereof will be omitted.

As is clear from a comparison between FIGS. 1 and 10, an image projection apparatus 1000 in the present embodiment is characterized in that a particular shape region detection unit 1014 and a particular shape memory 1015 are provided instead of the moving object region detection unit 105. Thus, the following description concentrates on this characteristic configuration.

The particular shape region detection unit 1014 detects a region considered to have a high degree of similarity to a particular shape stored in the particular shape memory 1015 from a sensed image with a projected image eliminated that is output from a projected image elimination unit 104. In the present embodiment, it is assumed that shape feature quantity information on, for example, the shape of a hand as shown in FIGS. 5C and 5D, is stored in the particular shape memory 1015 as information on the particular shape. Further, the particular shape region detection unit 1014 detects, as a particular shape region, a region considered to have a high degree of similarity to the shape of the hand, based on the shape feature quantity information on the shape of the hand. Then, a hot spot position detection unit 106 detects a particular portion of the detected particular shape region as a hot spot, and detects the position thereof (hot spot position).

Figure 11:
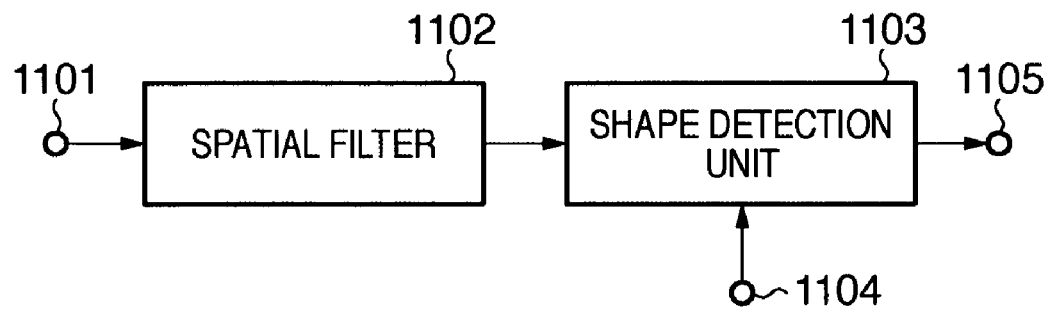
FIG. 11 is a block diagram illustrating a configuration example of a particular shape region detection unit 1014 in the image projection apparatus 1000 according to the second embodiment of the present invention.

FIG. 11 is a block diagram illustrating a configuration example of the particular shape region detection unit 1014 in the image projection apparatus 1000 in the present embodiment.

The sensed image with the projected image eliminated is input to a terminal 1101 from the projected image elimination unit 104. In a spatial filter unit 1102, predetermined smoothing is carried out for eliminating random noise components. A shape detection unit 1103 detects, based on the shape feature quantity information obtained via a terminal 1104 from the particular shape memory 1015, a particular shape region in the sensed image with the projected image eliminated, and outputs from a terminal 1105 information for specifying the detected particular shape region.

The method for detecting the particular shape region in the shape detection unit 1103 is not particularly limited, and thus, for example, a well-known region detection algorithm can be used by comparison of region splitting using the luminance level, the hue, and the like with the shape feature quantity which is independent of rotation or scaling of the shape.

The hot spot position detection unit 106 detects, from the particular shape region detected by the particular shape region detection unit 1014, a particular portion to be used for determining operations on an operation GUI, for example, a fingertip as a hot spot, and detects the position thereof (hot spot position). As in the first embodiment, for a specific approach for carrying out this detection, known techniques are available as fingertip detection approaches according to region tip detection or circular region detection, and detailed descriptions thereof will be thus omitted here.

Processing carried out by the other components is as described in the first embodiment, and descriptions thereof will be omitted.

Figure 12:
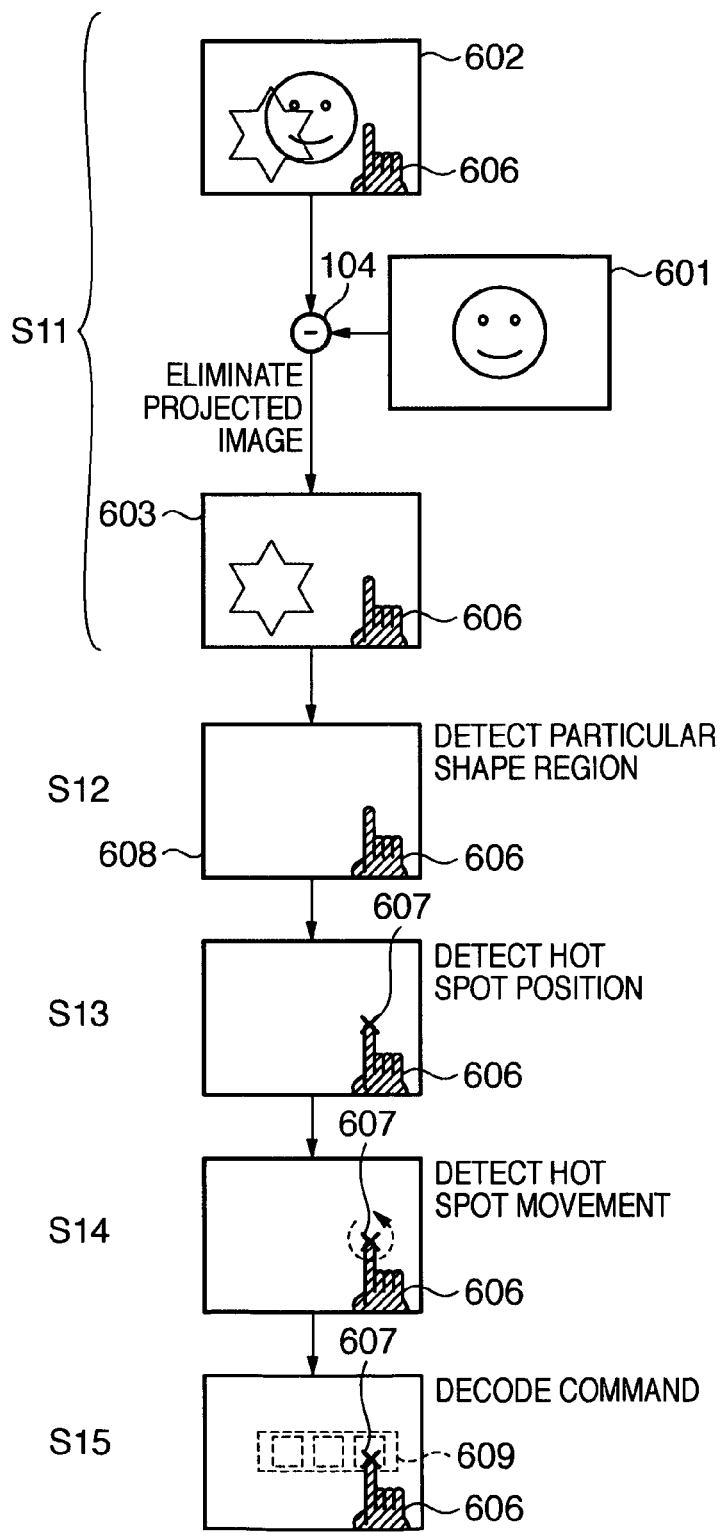
FIG. 12 is a diagram schematically illustrating detection of user operation in the image projection apparatus 1000 according to the second embodiment of the present invention.

FIG. 12 is a diagram schematically illustrating detection of user operation in the image projection apparatus 1000 in the present embodiment.

In the present embodiment, the particular shape region is detected, and it is thus unlikely that a pattern or the like existing on the projection surface will be falsely detected. Therefore, it is not necessary to obtain the difference between two sensed images with projected images eliminated as in the first embodiment.

Also in the example of FIG. 12, an input image 601, that is, a projected image is a face mark, and there is a star pattern on a projection surface to serve as a background. Therefore, the face mark and the star pattern are both contained in a sensed image 602. Although not shown in FIG. 12, in a case in which an operation GUI is superimposed, the input image 601 contains an image of the operation GUI.

The example of FIG. 12 differs from the example of FIG. 6 in that there is a hand 606 as an operation object in a sensed range (that is, contained in the sensed image 602) from the beginning.

In S11 of FIG. 12, the input image 601 (that is, the projected image) is eliminated from the sensed image 602 in the projected image elimination unit 104. A difference image 603 obtained by this processing contains the star background pattern and the hand 606, regardless of whether or not the operation GUI image is contained in the input image 601.

In S12, the particular shape region detection unit 1014 detects a particular shape region from the sensed image with the projected image eliminated, which is output from the projected image elimination unit 104. In the present embodiment, since a hand-shaped region is detected as the particular shape region, the region of the hand 606 is detected.

In S13, the hot spot position detection unit 106 detects, from the region detected as the particular shape region in S12, the position of a particular portion (here, a fingertip) to be used for determining operations on the operation GUI as a hot spot position 607.

In S14, a hot spot movement detection unit 107 detects movements of the hot spot, from temporal variations of the hot spot position 607 detected in S13.

In S15, a command decode unit 109 specifies, in a case in which the operation GUI 609 is displayed, the display position of an operation GUI 609 and an operation instructed by the user from the movement of the hot spot detected in S14 and the position of the hot spot, and outputs a corresponding device operation command.

As described above, according to the present invention, in addition to the advantageous effects of the first embodiment, the configuration for detecting the particular shape region eliminates the need for obtaining the difference between sensed images with input images eliminated, which are temporally separated by a detection interval T. Therefore, a more simplified configuration can be achieved.

Third Embodiment

Figure 13:
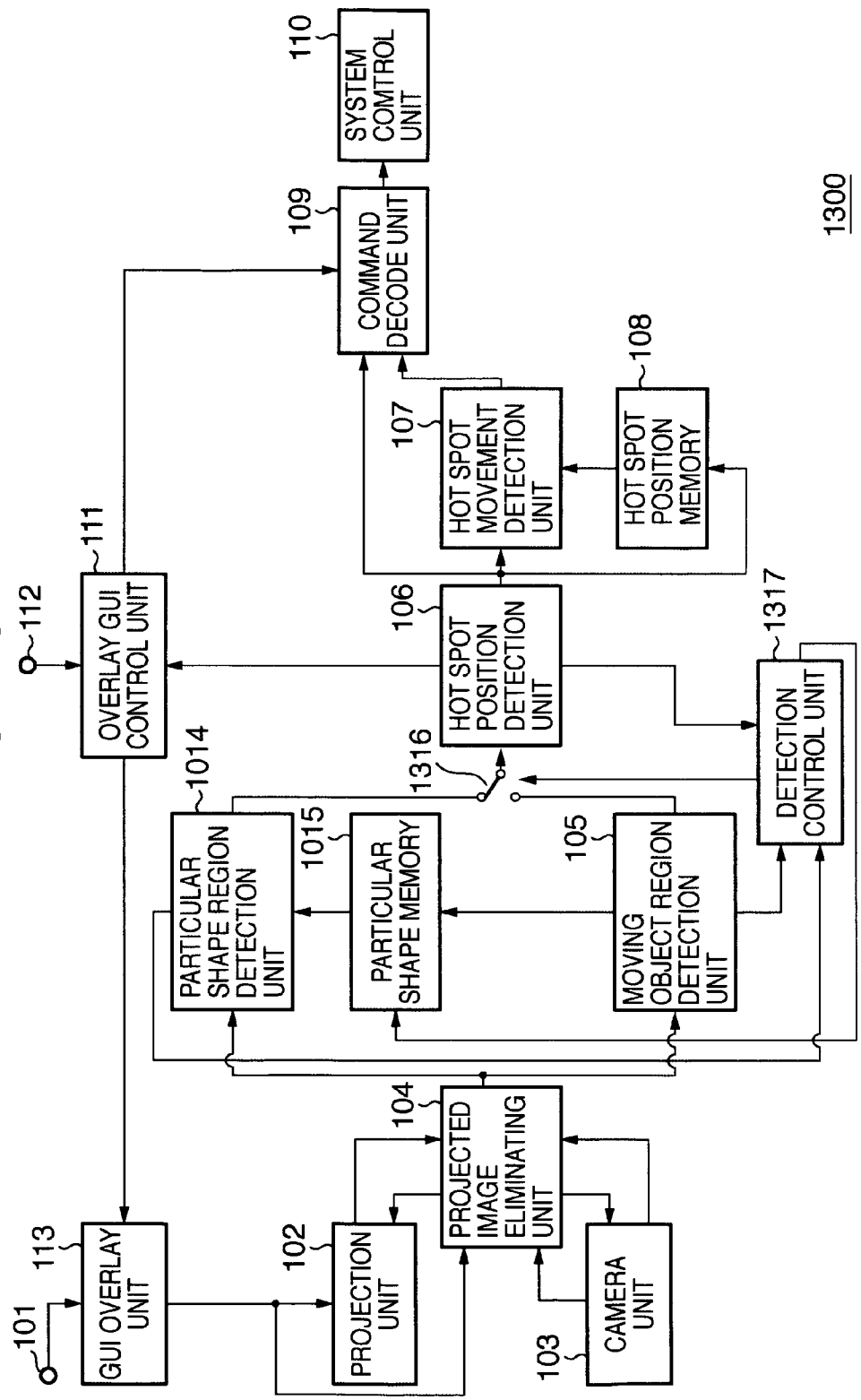
FIG. 13 is a block diagram illustrating a schematic configuration example of an image projection apparatus 1300 according to a third embodiment of the present invention.

FIG. 13 is a block diagram illustrating a schematic configuration example of an image projection apparatus according to a third embodiment of the present invention. In FIG. 13, the same components as those of FIG. 1 or 10 are denoted by the same reference numerals, and overlapping descriptions thereof will be omitted.

As is clear from FIG. 13, an image projection apparatus 1300 in the present embodiment includes both a moving object region detection unit 105, and a particular shape region detection unit 1014 and a particular shape memory 1015, and is characterized in that moving object region detection as in the first embodiment and particular shape region detection as in the second embodiment are used adaptively and selectively in accordance with control exercised by a detection control unit 1317. Thus, the following description will concentrate on this characteristic configuration.

The moving object region detection unit 105 detects a significant region regarded as a moving object, from a sensed image with a projected image eliminated, which is output from a projected image elimination unit 104. Although the configuration of the moving object region detection unit 105 is as described in the first embodiment with reference to FIG. 3, in a case in which the significant region is detected in the present embodiment, the shape feature quantity as information for specifying the significant region is stored in a particular shape memory 1015 in accordance with control exercised by the detection control unit 1317.

On the other hand, the particular shape region detection unit 1014 detects, as described in the second embodiment, a region considered to have a high degree of similarity to a particular shape from the sensed image with the projected image eliminated, based on the shape feature quantity of the particular shape stored in the particular shape memory 1015. In the present embodiment, for the shape feature quantity to be used here, in a case in which a significant region is detected, the shape feature quantity of that significant region is used to detect a particular shape region. More specifically, subsequent particular shape region detection is carried out with the use of, as the particular shape, the shape of the significant region detected in the moving object region detection unit 105.

The particular shape region detection unit 1014 is also as described in the second embodiment, and the description thereof will be thus omitted.

The detection control unit 1317 switches a switch 1316 in accordance with the detection result from the moving object region detection unit 105 and the detection result from the particular shape region detection unit 1014, and selects region information to be supplied to a hot spot position detection unit 106.

More specifically, the detection control unit 1317 switches the switch 1316 such that the output from the moving object region detection unit 105 is selected when the region of the operation object is not detected, as shown in FIG. 5B. Further, the detection control unit 1317 switches the switch 1316 such that the output from the particular shape region detection unit 1014 is selected when the region of the operation object is detected, as shown in FIG. 5C. In addition, in this case, the detection control unit 1317 instructs the moving object region detection unit 105 to write the shape feature quantity of the detected moving object region (significant region) in the particular shape memory 1015.

After that, in a case in which no particular shape region becomes able to be detected in the particular shape region detection unit 1014, the detection control unit 1317 clears the particular shape memory 1015, and switches the switch 1316 such that the output from the moving object region detection unit 105 is selected.

Following the detected operation object region in accordance with such adaptive selection processing allows detection of the hot spot even when the object stands still. Further, false detection due to the still background pattern can be prevented.

The processing carried out by the hot spot position detection unit 106 and subsequent units is as described above, and descriptions thereof will be thus omitted.

Figure 14:
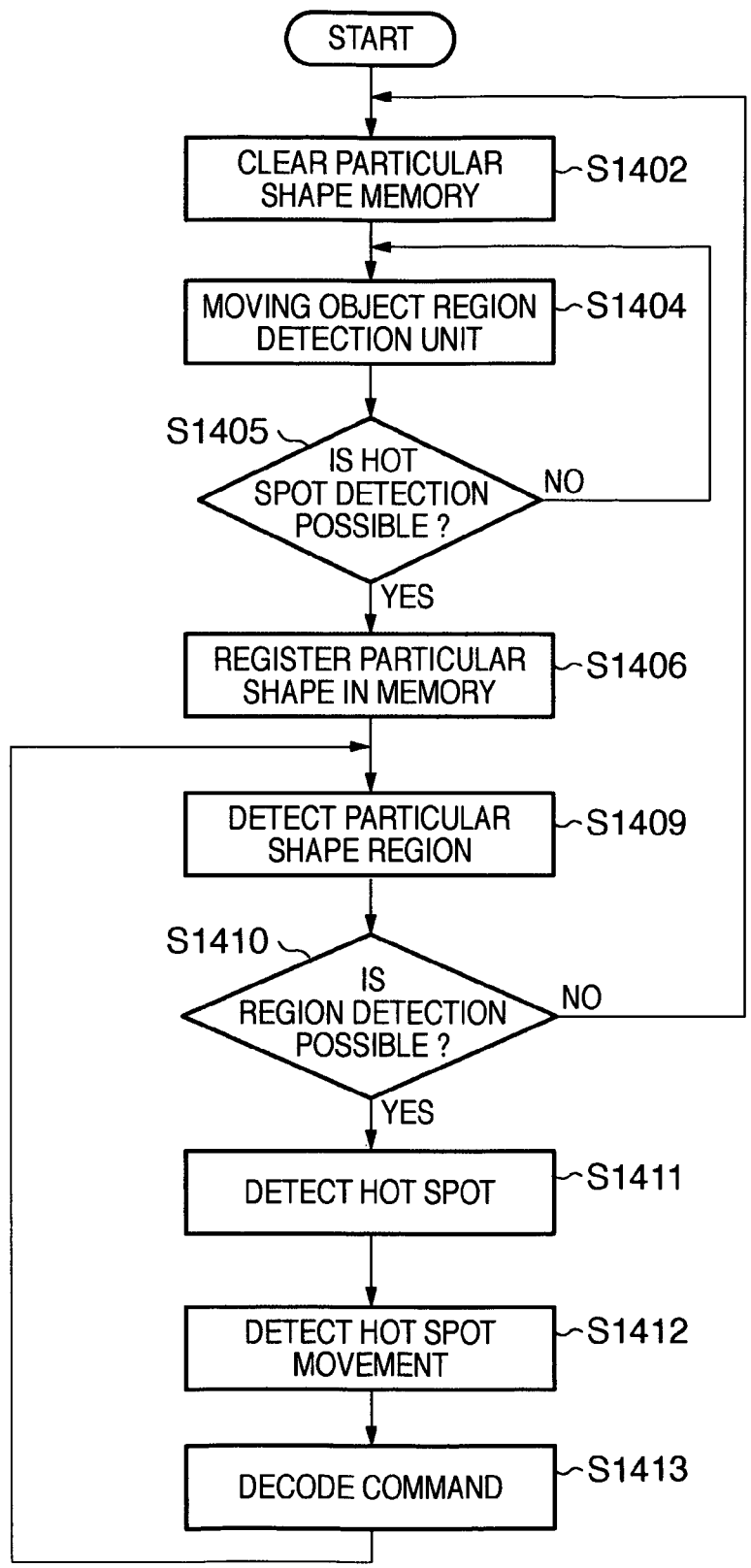
FIG. 14 is a flowchart for explaining operation of the image projection apparatus 1300 according to the third embodiment of the present invention.

The operation of the image projection apparatus described above in the present embodiment will be described in more detail with reference to a flowchart shown in FIG. 14. Initially, the switch 1316 is controlled such that the output from the moving object region detection unit 105 is selected.

In S1402, the detection control unit 1317 clears the particular shape memory 1015.

In S1404, the moving object region detection unit 105 detects a moving object region (a significant region) as described in the first embodiment.

In S1405, the hot spot position detection unit 106 determines whether or not a significant hot spot (for example, a portion regarded as a fingertip) can be detected in the moving object region detected by the moving object region detection unit 105. The hot spot position detection unit 106 notifies the detection control unit 1317 of the determination result. If no significant hot spot can be detected in the hot spot position detection unit 106, the process is returned to S1404 to continue detection processing in the moving object region detection unit 105. It is to be noted that while no significant hot spot can be detected in the hot spot position detection unit 106, the detection control unit 1317 keeps the switch 1316 so as to select the output from the moving object region detection unit 105.

On the other hand, in S1405, in a case in which a significant hot spot can be detected in the hot spot position detection unit 106, in S1406 the detection control unit 1317 instructs the moving object region detection unit 105 to register the shape feature quantity of the detected moving object region in the particular shape memory 1015. Further, the detection control unit 1317 switches the switch 1316 such that the output from particular shape region detection unit 1014 is selected.

In S1409, the particular shape region detection unit 1014 uses the shape feature quantity registered in the particular shape memory 1015 by the moving object region detection unit 105 to detect a particular shape region as described in the second embodiment.

In S1410, the detection control unit 1317 determines the detection result in the particular shape region detection unit 1014, and in a case in which no particular shape region can be detected, the processing is returned to S1402 to move to the moving object detection mode. In this case, the detection control unit 1317 switches the switch 1316 such that the output from the moving object region detection unit 105 is selected.

On the other hand, in a case in which a particular shape region can be detected in the particular shape region detection unit 1014, the hot spot position detection unit 106 detects a hot spot and the position thereof from the detected particular shape region in S1411.

In S1412, a hot spot movement detection unit 107 detects movements of the hot spot position detected by the hot spot position detection unit 106. In S1413, the command decode unit 109 determines a user operation based on the movements of the hot spot and the display position of the operation GUI, issues a device control command depending on the determination result, and outputs the device control command to a system control unit 110.

Then, the processing from S1409 is repeated.

As described above, according to the present embodiment, in addition to the advantageous effects of the first and second embodiments, the use of the shape of a significant region detected from an actual sensed image for detecting a particular shape region has the advantageous effect that the particular shape region can be detected with better accuracy. Further, user operations can be appropriately detected and determined under various conditions by adaptively switching between moving object detection and particular shape detection.

Other Embodiments

In each of the embodiments described above, the case has been described where the operation object used for operating the operation GUI is a hand. However, for example, even in a case in which the user does not operate the operation GUI directly by hand, the present invention is applicable. For example, in a case in which the user utilizes a pen, a pointer, or the like to operate the operation GUI, the pen or pointer can be treated as the operation object instead of the hand. For example, the case may be configured in such a way that the shape feature quantity of the pen or pointer is used to detect a particular shape region, and that the tip of the pen or indicator may be detected as a particular portion (hot spot). As described above, the present invention may essentially employ any method for detection of the shape or position of the operation object.

Further, the command decode unit 109 may determine a user operation without the use of position information on the operation GUI. For example, in a case in which the hot spot circulates, the particular movement itself of the hot spot may be determined as a command. Specifically, the circular motion of the hot spot can be determined as a display command for the operation GUI.

It is to be noted that also in a case in which the hot spot keeps still for a predetermined period of time or more, the standing-still can be regarded as "the particular movement of the hot spot" herein, that is, determined as a user operation.

As described above, in a case in which a user operation is determined independently of the operation GUI, the user can gesture to operate the image projection apparatus. Thus, the image of the operation GUI does not interfere with seeing an input image. In addition, the user may gesture in any location on the projected image, not in a particular region of the operation GUI, which thus has the advantage of a high degree of freedom in operation.

It goes without saying that the determination of a user operation with the use of the operation GUI and the operation of a user operation based on only position information on the hot spot (the position and temporal, variations thereof) can be executed in combination. For example, the determination of a user operation based on only position information on the hot spot can be executed for an operation for displaying the operation GUI, whereas the determination of a user operation based on both the display position of the operation GUI and position information on the hot spot can be carried out after displaying the operation GUI.

Further, although configurations of the image projection apparatuses provided with the camera unit have been descried in the embodiments described above, no camera unit has to be provided as long as a sensed image of a projection surface containing a projected image can be obtained.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-229456, filed on Sep. 4, 2007, which is hereby incorporated by reference herein its entirety.

The invention claimed is:

1. An image projection apparatus comprising:
   a projection unit adapted to project an input image onto a projection surface;
      an obtaining unit adapted to obtain a sensed image of a range containing an image projected onto the projection surface;
      a generating unit adapted to generate a difference image between the sensed image and the input image;
      a region detection unit adapted to detect a region corresponding to an operation object for operating the image projection apparatus, based on the difference image;
      a position detection unit adapted to detect information relating to a position of a particular portion of the region corresponding to the operation object detected by the region detection unit;
      a determination unit adapted to determine an operation carried out by the operation object, based on the information relating to the position of the particular portion detected by the position detection unit; and
      a control unit adapted to execute an action corresponding to the operation determined by the determination unit,
      wherein said region detection unit is further adapted to:
         perform a first detecting operation in which said region corresponding to the operation object for operating the image projection apparatus is detected based on a difference image generated by the generating unit at a first timing and a difference image generated by the generating unit at a second timing;
         store, in response to the detection of said region corresponding to the operation object for operating the image projection apparatus in the first detecting operation, shape feature quantity information of the detected region corresponding to the operation object for operating the image projection apparatus in a memory; and
         perform, based on the shape feature quantity information, a second detecting operation in which a region in the difference image generated by the generating unit, which is considered to have a high degree of similarity to a shape of the detected region corresponding to the operation object for operating the image projection apparatus, is detected as a region corresponding to the detected region corresponding to the operation object for operating the image projection apparatus.

2. The image projection apparatus according to claim 1, further comprising an overlay unit adapted to supply, to the projection unit, the input image on which a GUI image for operating the image projection apparatus is superimposed,
   wherein the determination unit determines the operation carried out by the operation object, based on the information relating to the position of the particular portion detected by the position detection unit and information relating to the position of the GUI image.

3. The image projection apparatus according to claim 1, wherein said region detection unit performs the first detecting operation when the region considered to have a high degree of similarity to a shape of the detected region corresponding to the detected region corresponding to the operation object for operating the image projection apparatus is no longer detected in the second detecting operation.

4. The image projection apparatus according to claim 3, wherein said region detection unit stops the second detecting operation when the first detecting operation is performed.

5. The image projection apparatus according to claim 4, wherein said region detection unit clears the shape feature quantity information stored in the memory when the first detecting operation is performed.

6. The image projection apparatus according to claim 1, wherein said region detection unit stops the first detecting operation when the second detecting operation is performed.

7. The image projection apparatus according to claim 1, wherein said region detection unit determines, as the region corresponding to the detected region corresponding to the operation object for operating the image projection apparatus, a closed region excluding isolated pixels in an image representing a difference between the difference images obtained by the generating unit at the first and the second timings.

8. The image projection apparatus according to claim 1,
   wherein said region detection unit detects, during the first detecting operation, the region corresponding to the detected region corresponding to the operation object for operating the image projection apparatus from a region within and smaller than a region of the projection surface that corresponds to the input image projected by the projection unit.

9. A control method for an image projection apparatus, comprising:
   a projection step for projecting an input image onto a projection surface by a projection unit;
   an obtaining step for obtaining a sensed image of a range containing an image projected onto the projection surface;
   a generating step for generating a difference image between the sensed image and the input image;
   a region detection step for detecting a region corresponding to an operation object for operating the image projection apparatus based on the difference image;
   a position detection step for detecting information relating to the position of a particular portion of the region corresponding to the operation object detected in the region detection step;
   a determination step for determining an operation carried out by the operation object, based on the information relating to the position of the particular portion detected in the position detection step; and
   a control step for controlling an action corresponding to the operation determined in the determination step,
   wherein said region detection step further comprises:
      a step of performing a first detecting operation in which said region corresponding to the operation object for operating the image projection apparatus is detected based on a difference image generated by the generating unit at a first timing and a difference image generated by the generating unit at a second timing;

a step of storing, in response to the detection of said region corresponding to the operation object for operating the image projection apparatus in the first detecting operation, shape feature quantity information of the detected region corresponding to the operation object for operating the image projection apparatus in a memory; and a step of performing, based on the shape feature quantity information, a second detecting operation in which a region in the difference image generated by the generating unit, which is considered to have a high degree of similarity to a shape of the detected region corresponding to the operation object for operating the image projection apparatus, is detected as a region corresponding to the detected region corresponding to the operation object for operating the image projection apparatus.

* * * * *